United States Patent
Rueping

(10) Patent No.: US 8,005,212 B2
(45) Date of Patent: Aug. 23, 2011

(54) DEVICE AND METHOD FOR PERFORMING A CRYPTOALGORITHM

(75) Inventor: Stefan Rueping, Lengdorf (DE)

(73) Assignee: Infineon Technologies AG (DE)

( * ) Notice: Subject to any disclaimer, the term of this patent is extended or adjusted under 35 U.S.C. 154(b) by 1863 days.

(21) Appl. No.: 11/020,631

(22) Filed: Dec. 22, 2004

(65) Prior Publication Data

US 2005/0147242 A1     Jul. 7, 2005

Related U.S. Application Data

(63) Continuation of application No. PCT/EP03/07135, filed on Jul. 3, 2003.

(30) Foreign Application Priority Data

Jul. 10, 2002   (DE) .................................. 102 31 195

(51) Int. Cl.
 *H04K 1/04* (2006.01)
 *H04K 1/06* (2006.01)
(52) U.S. Cl. ............ 380/37; 380/28; 380/30; 380/33; 380/44; 380/46; 380/255; 380/277; 713/155; 713/165; 713/189; 713/191; 708/252; 708/255; 708/500; 331/78; 326/38; 326/39
(58) Field of Classification Search ............... 380/37
See application file for complete search history.

(56) References Cited

U.S. PATENT DOCUMENTS

| | | | | |
|---|---|---|---|---|
| 4,157,454 A * | 6/1979 | Becker | ........................... | 380/37 |
| 4,255,811 A * | 3/1981 | Adler | .............................. | 380/37 |
| 4,543,646 A * | 9/1985 | Ambrosius et al. | ............. | 380/29 |
| 6,014,446 A * | 1/2000 | Finkelstein | ...................... | 380/46 |
| 6,028,939 A | 2/2000 | Yin | | |
| 6,405,273 B1* | 6/2002 | Fleck et al. | .................. | 710/310 |
| 2002/0078348 A1 | 6/2002 | Leung et al. | | |
| 2002/0106080 A1* | 8/2002 | Qi et al. | ......................... | 380/37 |

OTHER PUBLICATIONS

Phillips B J et al.; "Implementing 1,024-bit RSA Exponentiation on a 32-bit Processor Core"; IEEE International Conference on Application-Specific Systems, Architectures, and Processors (ASAP '00), Jul. 10, 2000, pp. 127-137.

Menezes, A.J. et al.; "Handbook of Applied Cryptography"; ISBN 0-8493-8523-7, pp. 612-613, Printed Published 1997.

* cited by examiner

*Primary Examiner* — William Korzuch
*Assistant Examiner* — Bryan Wright
(74) *Attorney, Agent, or Firm* — Dickstein Shapiro LLP

(57) ABSTRACT

A device for executing a cryptoalgorithm including a central processing unit for a first sub-group of operations and for a flow control of the cryptoalgorithm as well as a hardware circuit for a second sub-group of operations, wherein the first sub-group preferably includes arithmetic and/or logic operations, while the second sub-group includes rotation operations, permutation operations, substitution operations or selection operations.

20 Claims, 6 Drawing Sheets

P: plain text; C: encrypted data; K: key

DEVICE AND METHOD FOR PERFORMING A CRYPTOALGORITHM

CROSS-REFERENCE TO RELATED APPLICATION

This application is a continuation of co-pending International Application No. PCT/EP03/07135, filed Jul. 3, 2003, which designated the United States and was not published in English and is incorporated herein by reference in its entirety.

BACKGROUND OF THE INVENTION

1. Field of the Invention

The present invention relates to cryptographic algorithms and, in particular, to concepts for processing cryptographic algorithms in efficient and economical ways.

2. Description of the Related Art

In technology, a plurality of cryptographic algorithms are known, wherein certain cryptographic algorithms, such as, for example, the DES algorithm or the AES algorithm according to Rijndael, are round-based. A cryptographic algorithm working in rounds performs certain operations on bits to be encrypted in rounds, wherein the operations of a round are usually identical, wherein, however, a different round key is used in each round. Put generally, such a cryptographic algorithm includes a group of operations, wherein the operations typically include arithmetic and/or logic operations and rotation operations and/or permutation operations and/or substitution operations. In addition, such a round-based algorithm, apart from means for performing the individual operations, also requires means for flow control.

These will be illustrated subsequently referring to FIGS. 5 to 7 relating to the DES algorithm. It is to be pointed out in particular that the FIGS. 5 to 7 also relate to the double DES algorithm (2DES) or the triple DES algorithm (3DES) including a double or triple execution, respectively, of the DES algorithm.

FIG. 5 shows a device 50 for executing the DES algorithm in an encryption direction and a device 52 for executing the DES algorithm in a decryption direction (DES$^{-1}$).

Plain data P is fed into the DES device 50 in blocks of 64 bits. The device 50 also receives a key K including 56 bits. On the output side, the DES device 50 provides encrypted data C. By way of analogy, the DES decrypting device 52 receives a block of encrypted data including 64 bits. The key K is again 56 bits wide so that 64 bits of plain data again result at the output of the device 52. It is to be pointed out that the DES algorithm is a symmetrical algorithm in such a way that the same key K and inverse operations can be employed when both encrypting and decrypting.

The DES algorithm is detailed in "Handbook of Applied Cryptography", Menezes, van Oorschot, Vanstone, CRC Press, 1996, pages 252 to 260. For reasons of clarity, the principle flow of the DES algorithm will be illustrated subsequently referring to FIGS. 6 and 7. At first, 64 bits of plain text data are fed (block 60). Then, an initial permutation (IP) with the 64 bits of input data occurs. The output bits of block 61 are divided into a left half $L_0$ including the first 32 bits and into a right half $R_0$ including the second 32 bits (62). Subsequently, the right half $R_0$ is fed to a round function 63, wherein the round function also receives a key $K_1$ for the corresponding number of the round, in the present case the first round. The round function 63 provides a result which is XOR-ed with the left half of block 62 (64).

Subsequently, the left and right halves are exchanged so that the output data of the XOR linkage 64 is now treated as the right half $R_1$ for the next round, while the input data in the function 63 is now treated as the left half $L_1$. Then, by means of a round function 69, a processing using the key for the second round $K_2$ is performed to subject the result of the function 64 again to an XOR linkage 64 with $L_1$. The function 69 is identical to the function 63, except for the round key which, for the function 63, was the round key $K_1$ and which, for the function 69, is a round key for the second round $K_2$. This procedure is repeated, as can be seen in FIG. 6, for all the 16 rounds in order to perform again a left/right exchange in a block 66. The result of this exchange is then subjected to a final permutation 67, which in FIG. 6 is referred to as IP$^{-1}$, to bring out that this permutation is the permutation inverse to the permutation of block 61.

The output of the DES algorithm (block 68) then corresponds to the encrypted data C of FIG. 5. In the case of a 2DES algorithm, the output data in block 68 is again fed into block 60 to pass the DES algorithm again, as is illustrated in FIG. 6.

In the case of the 3DES algorithm, an additional third passage takes place.

The round keys $K_1, K_2, K_3, K_4, \ldots, K_{16}$ are calculated from the input key K of FIG. 5 using a certain algorithm which is known in technology and includes 28-bit rotation operations and bit selection tables using a first bit selection table PC1 and a second bit selection table PC2.

FIG. 7 shows a detailed illustration of the inner function f illustrated in FIG. 6 with the blocks 63, 69. At first, an expansion operation 70 with the 32-bit input data $R_{i-1}$ takes place. The result of the expansion operation 70 is then XOR-ed (71) with the round key $k_i$ calculated for this round i. The expansion operation produces 48 bits from 32 bits, wherein certain bits of the 32 input bits are double-used to produce 48 output bits. The 48 output bits are then classified in 8×6 bits (block 72) and subjected to a bit substitution using 8 bit substitution tables, which in technology are referred to as S-BOXES, corresponding to their significance. The bit substitution tables generate 4 output bits of every 6 input bits so that 32 bits result from the 48 bits before the bit substitution (block 74). The output data of the bit substitution 73 is finally subjected to a permutation 75 to provide the result of block 63 and block 69, respectively, in a round of the DES algorithm, which is then, as is illustrated in FIG. 6 and has already been explained, subjected to an XOR linkage with the left half (block 64 or block 65).

With regard to the bit substitution 73, it is to be pointed out that the 48 bits present in block 72 are not used directly to address the S-BOXES but that a row value and a column value for the respective S-BOXES is calculated from these bits using an arithmetic linkage, with which the S-BOXES are addressed to provide 4 bit data present at the addressed location as a response to the addressing.

The permutation or expansion/permutation rules, respectively, of blocks 61, 67, 70, 75 and the bit selection rules for the key generation in the form of tables PC1 and PC2 are known in technology and are standardized for the DES algorithm. The same applies to the S-BOXES $S_1, S_2, \ldots, S_8$. Even the S-BOXES are standardized for the DES algorithm, and as well as the entire external flow illustrated in FIG. 6 and the round function f illustrated in FIG. 7.

Up to now, a special hardware module containing a complete implementation of the DES or 3DES algorithm, respectively, including the key generation and storage, flow control and all the operations required has been employed for speeding up the DES algorithm. This module, for reasons of safety, has been implemented as a full custom design for the largest part and is typically integrated in the design as a hard macro.

Thus, a hardware implementation of the DES algorithm results in the prior art which has an optimum speed but which is complicated with regard to the design and is also problematic with regard to the chip area requirements.

In particular in changes of the design or with an implementation of a new multi-functional cryptography processor, the hard macro must be re-processed manually and in a complicated way, which is complicated in both the design phase and in the test phase and problematic concerning the ever higher requirements to the "time to market".

In addition, the hard macro embodiment is not optimal either with regard to the chip area requirements, particularly since flow controls for a similar cryptographic algorithms implemented on the same multi-functional cryptochip are provided individually for each algorithm, although they, in principle, perform the same functions, that is the flow control of a round-based cryptoalgorithm.

In particular, the limitation of the chip area requirements specially applying for safety ICs which are to be employed on chipcards is a considerable limitation, particularly since the circuit designer, apart from a fast DES processor, of course also desires the largest possible amount of memory so that an optimum tradeoff between chip area requirements for the memory and chip area requirements for special modules, such as, for example, the DES module, must be made.

On the other hand, it is not of utmost importance for special applications that the algorithm is processed with maximum speed. It is true that a certain speed is required, but in some cases not the maximum speed possible obtained by a complete hardware design of the DES algorithm.

SUMMARY OF THE INVENTION

It is an object of the present invention to provide an economical concept for a nevertheless sufficiently fast implementation of a cryptoalgorithm.

In accordance with a first aspect, the present invention provides a device for executing a cryptoalgorithm, wherein the cryptoalgorithm has a group of operations including a first and a second sub-group, having a central processing unit for performing the first sub-group and for performing a flow control of the cryptoalgorithm; a hardware circuit for performing the second sub-group, wherein the hardware circuit has a first register having a rotational ability, a second register having a rotational ability, a multiplexer, a substitution memory for storing a bit substitution rule, and a control register for controlling the multiplexer depending on a bit pattern written into the control register by the central processing unit, the first register and the second register being connected to the data bus, the multiplexer and the substitution memory; and wherein the data bus is arranged between the central processing unit and the hardware circuit.

In accordance with a second aspect, the present invention provides a method of executing a cryptoalgorithm, wherein the cryptoalgorithm has a group of operations including a first and a second sub-group, using a central processing unit and a hardware circuit connected to the central processing unit via a data bus, wherein the hardware circuit has a first register having a rotational ability, a second register having a rotational ability, a multiplexer, a substitution memory for storing a bit substitution rule, and a control register for controlling the multiplexer depending on a bit pattern written into the control register by the central processing unit, and wherein the first register and the second register are connected to the data bus, the multiplexer and the substitution memory, with the steps of, in the central processing unit, feeding input data for an operation of the second sub-group to the hardware circuit and obtaining a result of the operation from the hardware circuit; in the hardware circuit, performing the operation of the second sub-group with input data for the operation fed by the central processing unit; and performing an operation of the first sub-group and a flow control of the cryptoalgorithm in the central processing unit.

The present invention is based on the finding that an economical and nevertheless sufficiently fast implementation of a cryptoalgorithm can be obtained by no longer executing the cryptoalgorithm by a hardware circuit alone but by a central processing unit taking over a sub-group of the operations of the cryptoalgorithm and the flow control of the cryptoalgorithm, and a hardware circuit which performs a second sub-group of the operations of the cryptoalgorithm and is connected to the central processing unit via a data bus.

According to the invention, the group of operations of which the cryptoalgorithm consists is divided into the first sub-group and the second sub-group, wherein the first sub-group is associated to the central processing unit, while the second sub-group is associated to the hardware circuit, wherein the hardware circuit is hard-wired or does not comprise a software programming, respectively, in order to be able to perform operations of the second sub-group quickly.

A preferred division of the group of operations of the cryptoalgorithm is that the first sub-group includes arithmetic and/or logic operations, such as, for example, the XOR linkages in a cryptoalgorithm as well as address calculations for the bit substitution tables, wherein the second sub-group includes rotation operations, permutation operations, expansion operations and/or selection/substitution operations.

Performing the second sub-group of operations in the central processing unit would be complicated in programming and require too many processing cycles. Thus, these operations are implemented in hardware, that is by multiplexers, registers with a rotational ability or directly addressable memories for a bit substitution, while the operations performed by the central processing unit executed very efficiently anyway, such as, for example, arithmetic and/or logic operations, are really executed by the central processing unit.

An advantage of the present invention is that the inventive concept can be synthesized since only certain operations, that is the second sub-group of operations, are to be formed in hardware, while the entire flow control, which is rather problematic with an ability to synthesize, can be programmed by means of software into the central processing unit (CPU).

A further advantage of the present invention is that it provides a scalability with regard to speed on the one hand which is doubtlessly the highest in a purely hardware implementation, and chip area requirements which is doubtlessly the lowest in a purely software implementation.

A particular advantage of the present invention is that in an implementation of the inventive concept on a multi-functional safety IC, the central processing unit which is already present on this chip anyway can be used so that no individual central HW processing unit in the form of a state machine must be formed for the cryptoalgorithm considered. The inventive concept thus enables a better usage of components already present and thus a chip area saving connected thereto.

A further advantage of the present invention is that in an implementation on a safety IC, the CPU of the safety IC is already protected from external cryptoanalysis attacks by certain safety measures anyway. Thus, the activities of the central processing unit are already easily protected from cryptoattacks when executing the cryptoalgorithm so that safety measures must only be provided for the hardware circuit, such as, for example, using a redundant design including an inverse control and an inverse output.

BRIEF DESCRIPTION OF THE DRAWINGS

Preferred embodiments of the present invention will be detailed subsequently referring to the appended drawings, in which.

DESCRIPTION OF THE PREFERRED EMBODIMENTS

Figure 1:
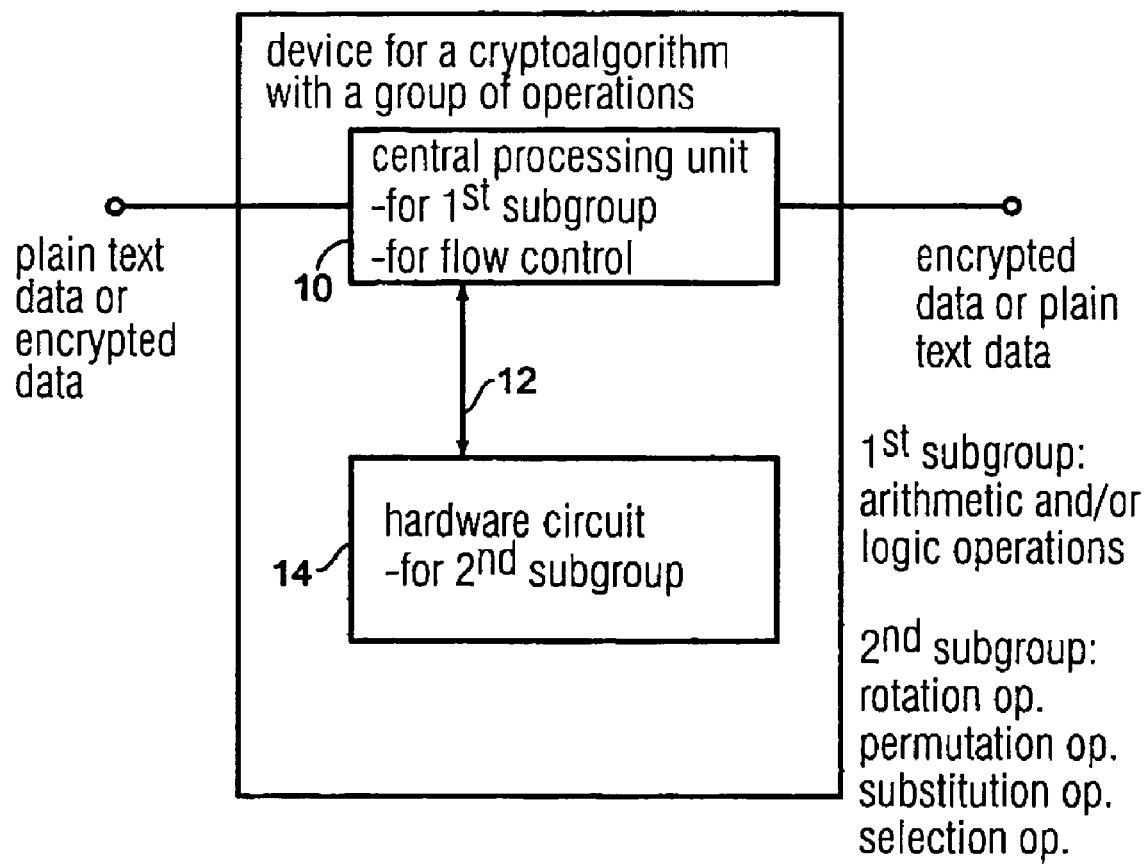
FIG. 1 is a block diagram of an inventive device for executing a cryptoalgorithm.

FIG. 1 shows a block diagram of an inventive device for executing a cryptoalgorithm, wherein the cryptoalgorithm comprises a group of operations including a first sub-group and a second sub-group. The device particularly comprises a central processing unit 10 for performing the first sub-group of operations and for a flow control of the cryptoalgorithm. The central processing unit is coupled to a hardware circuit 14 via a data bus 12, wherein the hardware circuit is specially designed for the execution of the second sub-group of operations. The hardware circuit does not include software programmability and preferably only consists of registers, one or several multiplexers and a memory as well as connecting lines between these individual elements.

In a preferred embodiment of the present invention, the first sub-group of operations executed by the central processing unit includes arithmetic and/or logic operations, while the second sub-group of operations comprises rotation operations, permutation operations, expansion operations, selection operations or substitution operations for data bits or blocks of data bits, respectively, processed by the cryptoalgorithm. According to the invention, the group of operations the cryptoalgorithm comprises is divided such that the complexity of the additional hardware is as small as possible. In addition, the operations are executed by the hardware circuit, which would require a complicated and slow realization on a standard CPU architecture on which the central processing unit is based.

With the example of the DES algorithm, the operations executed by the hardware circuit, that is the ones listed in the second sub-group, are the 28-bit rotation commands for the key generation, all the bit exchange operation resulting from the 6 tables for bit selections in the DES algorithm and the access to the 8 S-BOXES.

Figure 2:
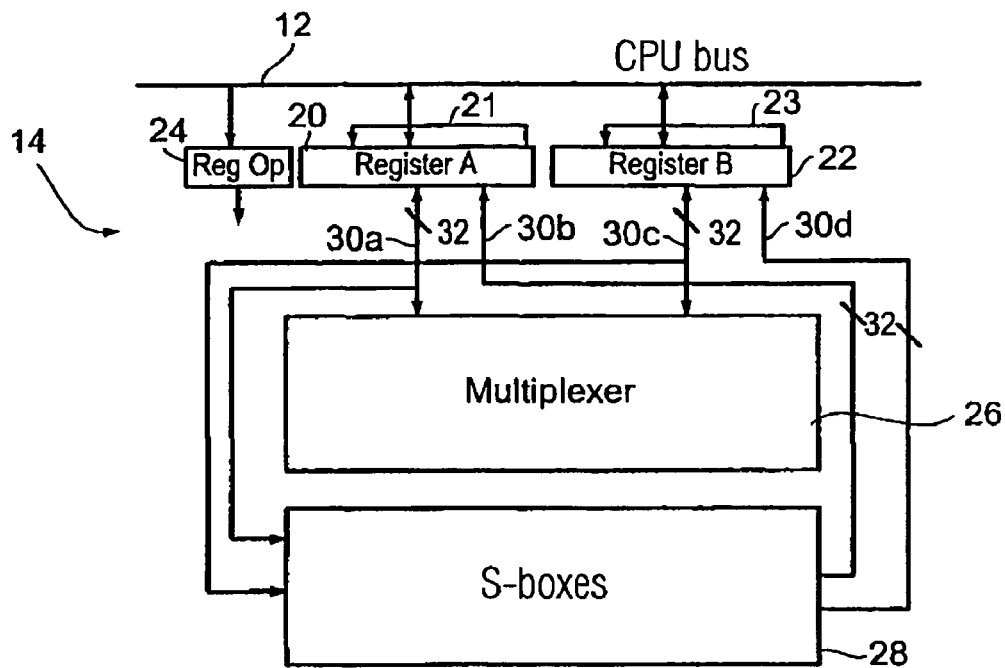
FIG. 2 is a preferred embodiment for the hardware circuit with the example of the DES algorithm.

FIG. 2 shows a preferred embodiment of the hardware circuit for the DES algorithm as a cryptoalgorithm. The hardware circuit 14 in FIG. 2 includes a first register 20 having a width of 32 bits, a second register 22 also having a width of 32 bits, a control register (Reg Op) 24 preferably having a width of 3 bits, a multiplexer means 26 and an S-BOXES block 28. The registers are connected to the multiplexer means 26 and the S-BOXES block 28, respectively, as is illustrated in FIG. 2, via 32-bit data buses 30a to 30d. The registers 20, 22 of which, according to the operation, one is provided for the left half and one is provided for the right half of the bits of a block, further include a rotational ability, as is schematically illustrated in FIG. 2 by rotational arrows 21, 23. It is to be pointed out that a rotational ability over 28 bits is sufficient for a key generation with the DES algorithm, which is why the arrows 21, 23 do not extend to the upper end of the registers 20, 22, but only to the 28th bit of the respective register.

The operations are executed by writing data in the two registers 20, 22, wherein the command, such as, for example, bit changing according to DES tables 1 to 6, is processed by writing the control register 24 and the result is again stored in the two data registers from which it can then be read out—caused by the CPU. In addition, the two registers are equipped with a rotational ability over 28 bits, as has already been illustrated.

From the S-BOXES reading is performed in the same way. The addresses for the S-BOXES are written into the registers 1 and 2 in parallel and the result occurs in the same registers thereafter.

The safety required can, for example, be obtained by redundantly designing the multiplexer and S-BOX blocks including an inverse control and an inverse output. The programming of the DES algorithm or the 2DES algorithm or the 3DES algorithm, respectively, takes place on the CPU, wherein the hardware circuit 14 is utilized for all the operations of the second sub-group.

Figure 3A:
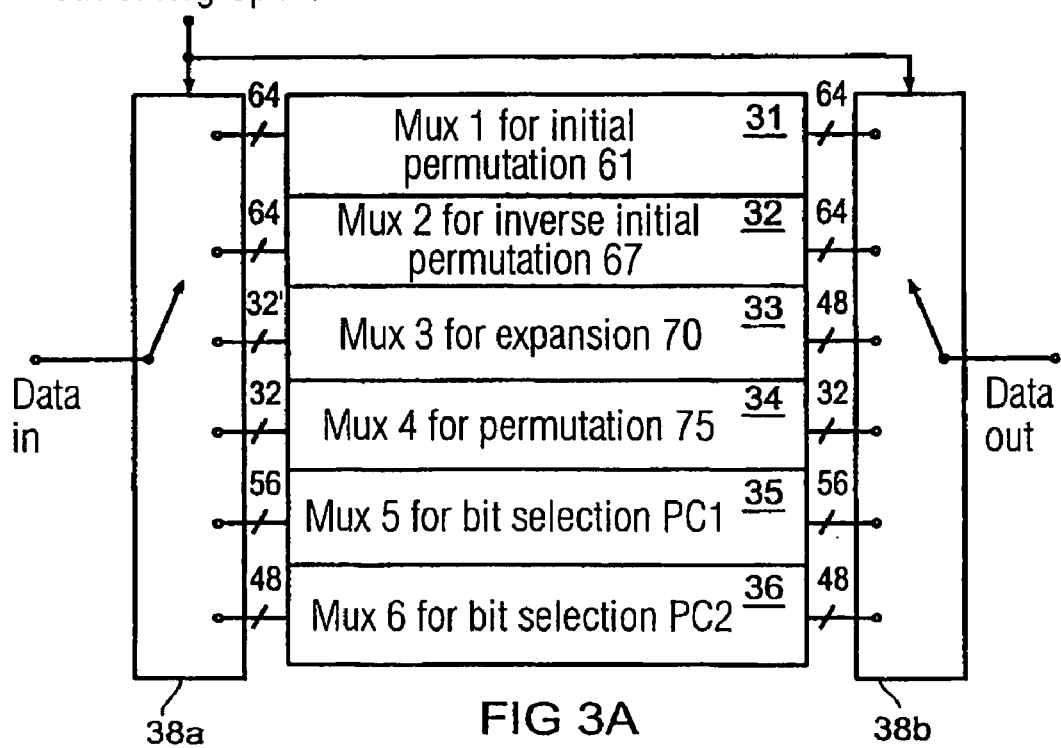
FIG. 3a is a first embodiment of the multiplexer means of FIG. 2.

FIG. 3a shows a preferred embodiment of the multiplexer means 26 of FIG. 2. The multiplexer means 26 includes 6 different multiplexers 31 to 36 including the respective bit exchange operations, that is permutation operations, expansion operations, selection operation etc., in a hard-wired form.

Figure 6:
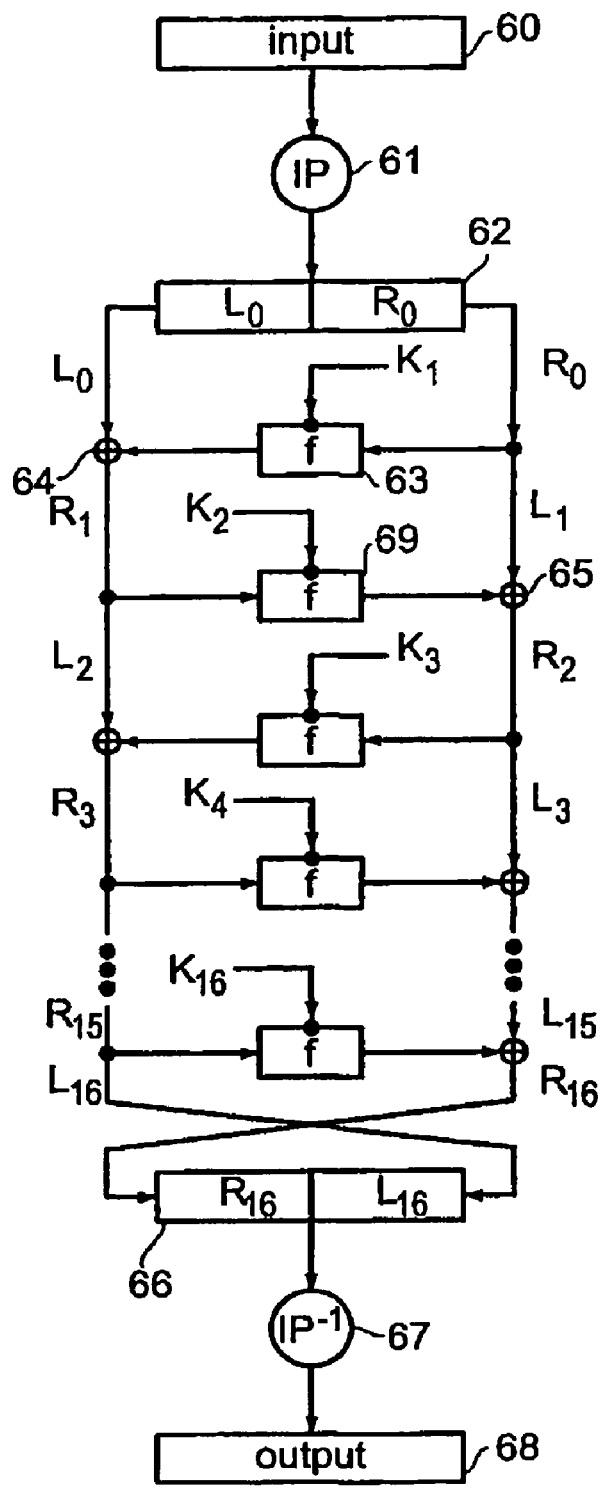
FIG. 6 is a detailed illustration of the DES algorithm with regard to the individual rounds.

In particular, the multiplexer 31 is provided for the initial permutation 61 of FIG. 6. This permutation maps 64 input bits to 64 output bits.

The multiplexer 32 is provided for the inverse initial permutation, that is for the final permutation 67 of FIG. 6. It also maps, in a hard-wired form, 64 input bits to 64 output bits.

Figure 7:
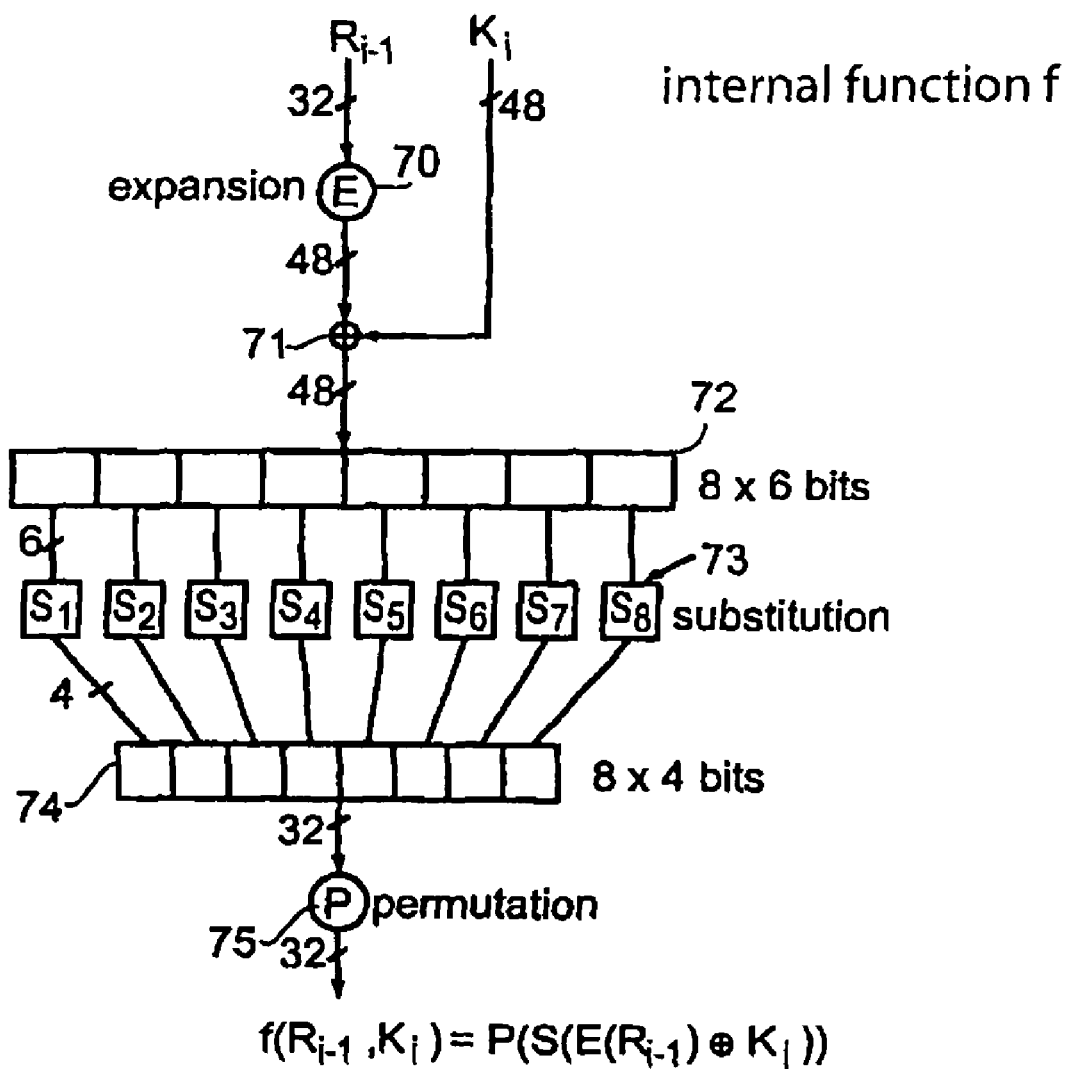
FIG. 7 is a detailed illustration of the internal function f of the DES algorithm.

The multiplexer 33 is provided for the expansion 70 of FIG. 7 in the internal function f. The expansion maps 32 input bits to 48 output bits in a hard-wired form, too.

The multiplexer 34 is provided for the permutation 75 of FIG. 7 and maps 32 input bits to 32 output bits in a hard-wired form, too.

Finally, the multiplexers 35 and 36 are provided for the bit selection in the course of the key generation in a hard-wired form, too, wherein the mulitplexer 35 maps 56 input bits to 56 output bits for the bit selection PC1, while the multiplexer 36 maps 48 input bits to 48 output bits for the bit selection PC2.

For selecting the individual multiplexers, a multiplexer selecting means including an input selecting means 38a and an output selecting means 38b which are controlled by the bit pattern written in the control register 24 is provided. The control register 24 is a 3-bit register in a preferred embodiment of the present invention, wherein these 3 bits are sufficient to be able to select one of the 6 multiplexers shown in FIG. 3a within the multiplexer means 26 of FIG. 2. As has already been explained, the central processing unit 10 of FIG. 1 writes to the control register 24 in the course of the flow control to select the correct operation in the course of the cryptoalgorithm flow.

Figure 3B:
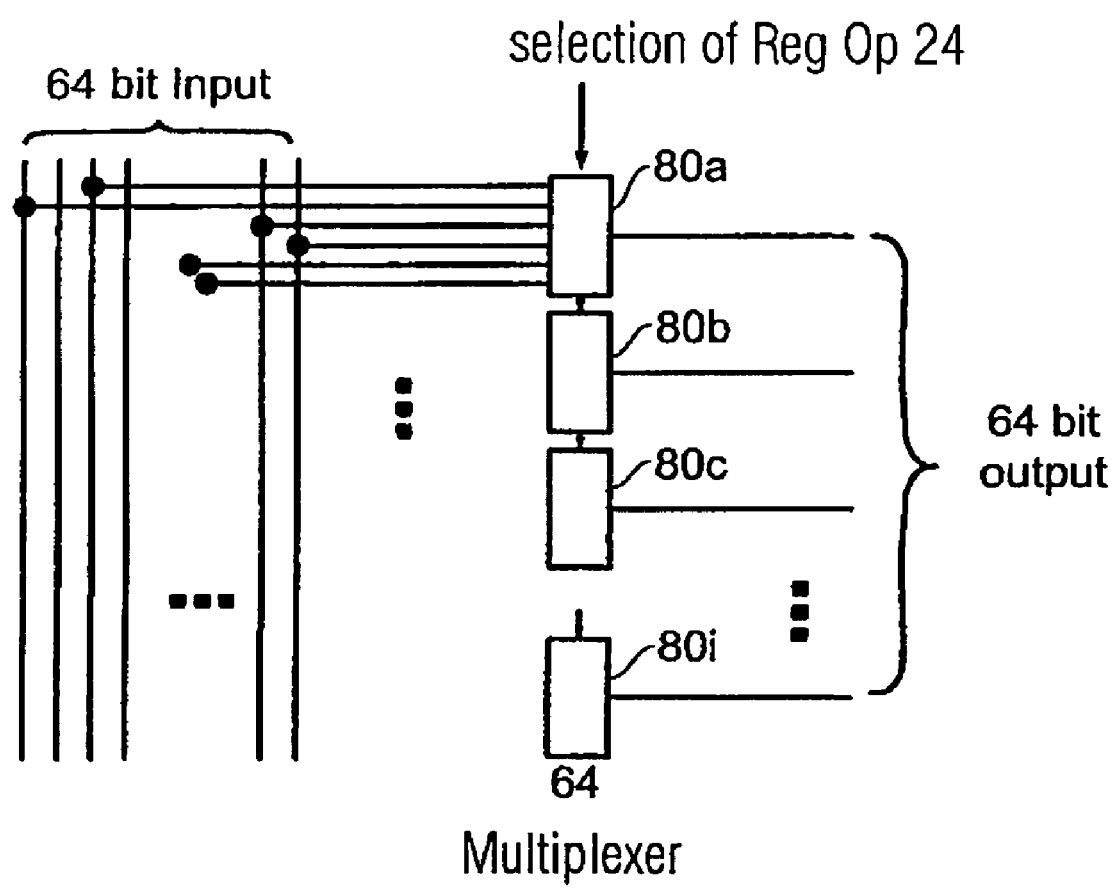
FIG. 3b is a second embodiment of the mulitplexer means of FIG. 2.

FIG. 3b shows an alternative embodiment for implementing the multiplexer means 26 of FIG. 2. The multiplexer means includes a number of individual multiplexers (80a, 80b, 80c, . . . 80i), wherein the number of individual multiplexers equals the number of input bits, and wherein each individual multiplexer comprises an output by which an output bit of an operation is defined. In addition, each individual multiplexer has an input comprising a number of input lines, wherein the number of input lines is equal to or smaller than the number of operations to be performed by the multiplexer means, and wherein each individual multiplexer is controllable by the control register to connect one of the number of input lines to the output. In particular, the first individual multiplexer, for example, always establishes the first bit of the permutations/selections or expansions to be performed. In the present embodiment there are 6 such operations. For each of the operations, an input line connected to the corresponding line of the 64-bit input is provided. According to the operations selected, the input line associated to this operation is thus connected to the output line of the multiplexer depending on the state of the control register 24.

The uppermost multiplexer thus selects according to the selecting signal applying which input bit shall be the new output bit. The second uppermost multiplexer does this for the output bit 2, etc. Since not every operation has a 64 bit wide output, not every multiplexer is required to have 6 inputs, but can and also will have fewer inputs.

Figure 4:
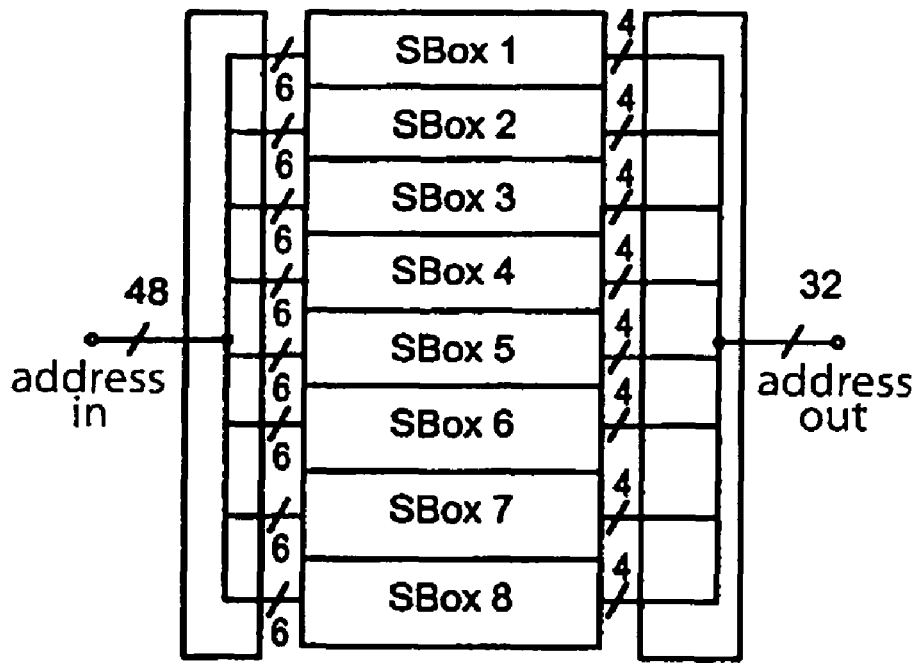
FIG. 4 is a preferred embodiment of the S-BOXES unit of FIG. 2.
Figure 5:
FIG. 5 is a schematic illustration of the DES algorithm.

FIG. 4 shows a detailed illustration of the S-BOXES means 28 of FIG. 2. The S-BOXES means includes the 8 S-BOXES S-BOX 1 to S-BOX 8 of the DES algorithm, each of which receives 6 bits as an input address and outputs 4 bits of output data. The S-BOXES are hard-wired to the 48-bit input bus and, on the output side, also hard-wired to the 32-bit output bus such that an automatic division of the addresses for one of the 8 S-BOXES results from the significance of the bits on the 48 bit wide input bus.

The flow of the DES algorithm will be illustrated subsequently with reference to the flow chart of FIG. 6 using the central processing unit 10 and the hardware circuit 14. The 64-bit input data block is obtained from the central processing unit and fed into the two registers 20, 22. Simultaneously, the control register 24 is controlled to select the multiplexer 31 of the multiplexer means 26. The 64 bits to be inverted are fed by the registers 20, 22 into the multiplexer 31 so that 64 output bits result which in turn are written to the registers 20, 22 and thus overwrite the input data. Subsequently, the contents of the register 22, after re-writing the control register 24, is fed to the multiplexer means 26 in order for the expansion 70 to be performed. The result of the expansion 70 is then again written into the register 22 and read by the central processing unit so that it can perform the XOR linkage 71 of FIG. 7 using the key for the first round.

The 48 bits which the CPU has calculated due to the XOR linkage with the round key are the addresses for the SBOX access. The XOR linkage with the round key is thus the address calculation for the S-BOX access. The 48 address bits for the 8 S-BOXES are then written again by the CPU into the two registers 20, 22 and fed to the S-BOXES means 28 which will usually only be embodied as a read-only memory, to obtain, on the output side, the bits (74 in FIG. 7) which are, for example, in turn written into the register B in order to be fed to the multiplexer means after correspondingly re-writing the control register 24, wherein the control register 24 is written such that the multiplexer means selects the multiplexer 34 for the permutation 75 of FIG. 7. The 32 output bits are again written into the register B. At this point, the central processing unit again reads out the contents of the register B 22. In addition, the CPU reads the contents of the register A 20 to perform the XOR operations 64 of FIG. 6 to obtain new input data for the next round, which is executed like the first round but now using the key for the second round.

For a key generation, the 64-bit key K is read into the two registers A, B by the central processing unit.

Subsequently, the longitudinal shift values for the 28-bit rotations are designed to perform—after correspondingly writing to the control register 24 by the central processing unit—the bit selections by the multiplexers 35 and 36, the results of which are written into the registers 20, 22 where the corresponding rotations take place.

It is to be noted that the hardware circuit can be employed correspondingly for the DES decryption.

In addition, it is to be noted that similar hardware circuits result for other cryptoalgorithms than the DES algorithm as long as they include operations which can be executed in hardware by hard-wired multiplexers, by memories or by registers having a rotational ability.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for executing a cryptoalgorithm, wherein the cryptoalgorithm comprises a group of operations including a first and a second sub-group, comprising:
   a central processing unit configured to perform the first sub-group and to perform a flow control of the cryptoalgorithm; and
   a hardware circuit configured to perform the second sub-group, wherein the hardware circuit comprises a first register having a rotational ability, a second register having a rotational ability, a multiplexer, a substitution memory configured to store a bit substitution rule, and a control register configured to control the multiplexer depending on a bit pattern written into the control register by the central processing unit, the first register and the second register being connected to a data bus, the multiplexer and the substitution memory,
   wherein the data bus is arranged between the central processing unit and the hardware circuit, and wherein the rotational ability is a connection between the first bit of a block of bits stored in a register to be rotated and the last bit of the block of bits stored in the register to be rotated.

2. The device according to claim 1, wherein the first sub-group comprises arithmetic and/or logic operations, and wherein the second sub-group comprises rotation operations, permutation operations, expansion operations, selection operations or substitution operations.

3. The device according to claims 1, wherein the cryptoalgorithm is round-based, wherein a round key for each round can be generated from an output key using a rotation and a bit selection, and wherein the multiplexer comprises a key multiplexer configured to perform the bit selection.

4. The device according to claim 1, wherein the cryptoalgorithm, as an operation, includes an initial permutation of a block of input data to be encrypted, and wherein the multiplexer comprises an initial permutation multiplexer configured to perform the initial permutation.

5. The device according to claim 1, wherein the cryptoalgorithm comprises a final permutation to obtain a block of encrypted data, and wherein the multiplexer comprises a final permutation multiplexer configured to perform the final permutation.

6. The device according to claim 1, wherein the cryptoalgorithm comprises an expansion operation, and wherein the multiplexer is formed to comprise an expansion multiplexer configured to perform the expansion operation.

7. The device according to claim 1, wherein the cryptoalgorithm is round-based and comprises a permutation operation in each round, wherein the multiplexer comprises a permutation multiplexer configured to perform the permutation operations.

8. The device according to claim 1, wherein addresses for the bit substitution operation are calculated using bits to be substituted, and wherein the address calculation can be performed in the central processing unit by an XOR linkage with a round key.

9. The device according to claim 1, wherein the cryptoalgorithm comprises at least one XOR operation, which can be executed in the central processing unit.

10. The device according to claim 1, wherein the cryptoalgorithm is a DES algorithm.

11. The device according to claim 1, wherein the multiplexer comprises several individual multiplexers, each formed to execute an expansion operation, a permutation operation or a bit selection operation.

12. The device according to claim 1, wherein the multiplexer comprises a number of individual multiplexers, wherein the number of individual multiplexers equals the number of input bits, and wherein each individual multiplexer comprises an output by which an output bit of an operation is defined, and wherein each individual multiplexer comprises an input having a number of input lines, wherein the number of input lines is equal to or smaller than the number of operations to be performed by the multiplexer, and wherein each individual multiplexer is controllable by the control register to connect one of the number of input lines to the output.

13. The device according to claim 1, wherein the cryptoalgorithm is a DES algorithm, wherein the first register and the second register are two 32-bit registers, wherein the control register is a 3-bit register, and wherein data connections between the first register and the second register and the multiplexer and substitution memory, respectively, are 32-bit connections.

14. The device according to claim 1, wherein the central processing unit is formed to be safe from external attacks.

15. The device according to claim 1, wherein the hardware circuit is formed to be protected from external attacks.

16. The device according to claim 1, being integrated with other components in an integrated circuit, wherein the central processing unit is further formed to interact with the other components or to control the other components.

17. The device according to claim 14, wherein the integrated circuit is a safety IC or is predestined for a chipcard.

18. A method of executing a cryptoalgorithm, wherein the cryptoalgorithm comprises a group of operations including a first and a second sub-group, the method comprising:
   providing a central processing unit and a hardware circuit connected to the central processing unit via a data bus, wherein the hardware circuit comprises a first register having a rotational ability, a second register having a rotational ability, a multiplexer, a substitution memory configured to store a bit substitution rule, and a control register configured to control the multiplexer depending on a bit pattern written into the control register by the central processing unit, and wherein the first register and the second register are connected to the data bus, the multiplexer and the substitution memory;
   in the central processing unit, feeding input data for an operation of the second sub-group to the hardware circuit and obtaining a result of the operation from the hardware circuit;
   in the hardware circuit, performing the operation of the second sub-group with input data for the operation fed by the central processing unit; and
   performing an operation of the first sub-group and a flow control of the cryptoalgorithm in the central processing unit,
   wherein the rotational ability is a connection between the first bit of a block of bits stored in a register to be rotated and the last bit of the block of bits stored in the register to be rotated.

19. The method according to claim 18, wherein the cryptoalgorithm is a DES algorithm, wherein the first sub-group comprises arithmetic and/or logic operations and the second sub-group comprises a rotation operation, a permutation operation, an expansion operation, a selection operation or a substitution operation.

20. The method according to claim 18, wherein the cryptoalgorithm comprises an XOR linkage with a key, and wherein the XOR linkage is executable in the central processing unit.

* * * * *